J. H. LAW.
SEED SEPARATOR.
APPLICATION FILED MAY 19, 1914.

1,244,102.

Patented Oct. 23, 1917.
2 SHEETS—SHEET 1.

Inventor
J. H. Law.

Witnesses

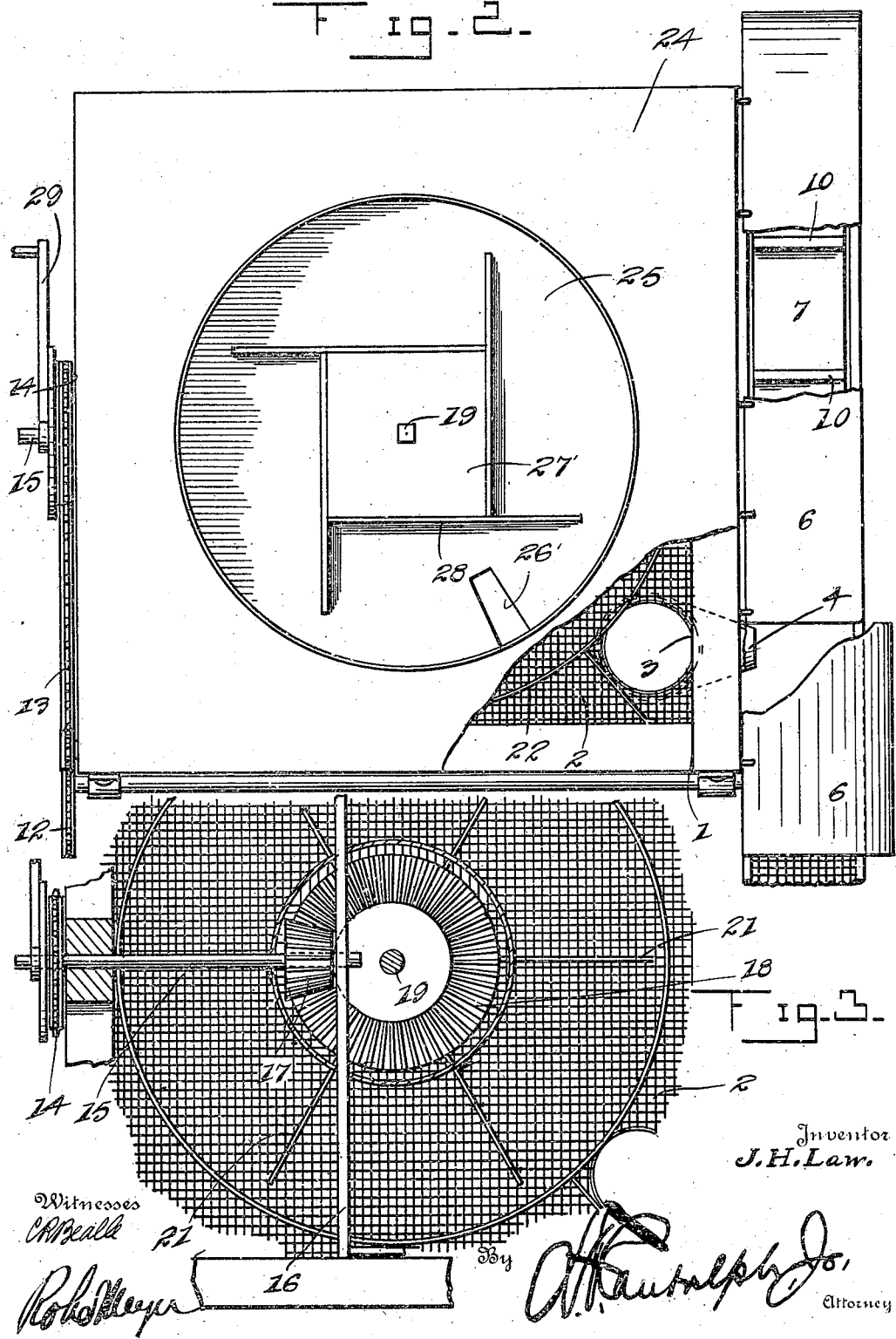

UNITED STATES PATENT OFFICE.

JOHN H. LAW, OF CARTERSVILLE, GEORGIA.

SEED-SEPARATOR.

1,244,102.  Specification of Letters Patent.  Patented Oct. 23, 1917.

Application filed May 19, 1914. Serial No. 839,562.

*To all whom it may concern:*

Be it known that I, JOHN H. LAW, a citizen of the United States, residing at Cartersville, in the county of Bartow and State of Georgia, have invented certain new and useful Improvements in Seed-Separators, of which the following is a specification.

This invention relates to separators and more particularly to a device for separating the black imperfect seed from the good seed preparatory to planting them and the primary object of the invention is the provision of a separator as specified which embodies a rotary feeding mechanism rotatable horizontally for separating the good seeds from the imperfect seeds.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters of reference designate like or corresponding parts throughout the several views, and in which:—

Figure 1 is a side elevation of the improved seed separator, showing parts thereof broken away.

Fig. 2 is a top plan view of the seed separator, showing parts thereof broken away.

Fig. 3 is a fragmentary cross sectional view exposing the rotary seed separator in plan.

Fig. 4 is a detail fragmentary side elevation of the improved seed separator.

Fig. 5 is a fragmentary sectional view of the partition.

Referring more particularly to the drawings, 1 designates the supporting frame which has a foraminous partition or base 2 formed thereupon and extending transversely thereacross, intermediate of its vertical ends, as is clearly shown in Fig. 2 of the drawings. The foraminous base 2 has an opening 3 formed in one corner thereof, which opening has a chute 4 communicating therewith and extending diagonally downward through one side of the casing, and communicating with the opening 5 which is formed within the carrier casing 6.

A carrier or conveyer 7 which travels over rollers 8 and 9 is positioned within the carrier or protective casing 6, and it has a plurality of transversely extending bars 10 formed upon its outer surface, for receiving the seeds when they are deposited by the chute 4 within the casing and carrying them upwardly and outward through the egressing opening of the casing into any suitable receptacle preparatory to the planting of the seed. The roller 8 is keyed upon a shaft 11, which shaft extends across one side of the supporting frame 1 and has a sprocket wheel 12 mounted upon the end opposite to the end upon which the roller is mounted. The sprocket 12 has a sprocket chain 13 passing therearound, which sprocket chain passes about the sprocket wheel 14 and transmits the power thereto which is transmitted to the shaft 11 and the sprocket 12 from any suitable prime mover (not shown).

The sprocket 14 is mounted upon one end of a shaft 15, which shaft extends radially into and toward the central axis of the supporting frame, as is clearly shown in Fig. 3 of the drawings, and it has its inner terminal end rotatably seated in a bracing arm 16, which extends diametrically across a supporting frame. A bevel gear 17 is mounted upon the shaft 15 and meshes with a second bevel gear 18 which is mounted upon a shaft 19. The shaft 19 extends vertically within the supporting frame 1 and it has a seed separator 20 mounted upon its lower terminal end. The seed separating rotor 20 constitutes a plurality of radially extending paddles 21, which are secured to the under surface of the bevel gear 18, and which move about over the upper surface of the transverse foraminous base or partition 2.

The foraminous base 2 has a circular partition 22 mounted thereupon and extending upwardly therefrom, which partition forms a retainer for the seed which are deposited therein for separation.

A casing 23 is positioned concentrically about the shaft 19, and it depends from the base 24 of the receiving hopper 25. The receiving hopper 25 is preferably constructed of metal and the shaft 19 extends upwardly therein, having its upper terminal ends which project into the receiving portion of the hopper square or rectangular in cross section.

The base 24 of the hopper 25 has an opening 26' formed therein adjacent the side wall of the receiving hopper, which opening is provided for permitting of the passage of the seed onto the foraminous partition 2, and it is positioned so that the seed will be deposited within the partition 22 and exteriorly of the partition 23, and to keep the gears 18 and 17 free from engagement with the seed. The upper rectangular end of the shaft 19 has a rotor 27 formed thereupon, which rotor is square in plan and has a plurality of arms 28 secured to its sides and projecting outwardly from the corners of the rotor, which arms will engage the seed in the receiving portion of the hopper and move it about therein, causing it to fall through the opening 26' into the compartment formed by the partition 22 and upon the foraminous partition 2.

If it is so desired, a crank handle 29 may be attached to the shaft 15 for the rotation thereof, or any other suitable type of means may be connected to the shaft to provide the necessary power for the rotation of the same.

In the operation of the improved seed separator as specified; when it is desired to separate the imperfect seed from the perfect ones, the seed is deposited within the receiving portion of the hopper 25, and the rotation of the shaft 15 will impart rotary motion to the vertical shaft 19 through the medium of the bevel gears 17 and 18, which will in turn rotate the rotors 27 and 20. The arms of the rotor 27 will force the seed downwardly through the opening 26', from whence it will fall upon the surface of the foraminous partition 2, and the continued rotation of the rotor 20 will force the imperfect seed through the foraminous partition into the bottom portion of the supporting structure 1, while the perfect or good seed will be segregated and forced outwardly through the opening 3 and through the chute 4 upon the conveyer 7.

In reducing the invention to practice, certain minor features of construction, combination and arrangement of parts may necessitate alteration, to, which the applicant is entitled provided such alterations are comprehended within the scope of what is claimed.

What is claimed is:—

1. A seed separator including a frame, a foraminous partition in the frame adjacent one end thereof, a hopper supported by the frame, a shaft located centrally in the hopper, a rotor on the upper end of the shaft and operating in the hopper, said hopper provided with an opening establishing communication between the hopper and frame, a rotor on the lower end of the shaft and in close proximity to the foraminous partition as and for the purpose specified.

2. In a seed separator a frame, a foraminous partition located in the frame, a hopper supported by the frame, said hopper provided with an opening establishing communication between the hopper and partition, a vertical shaft located in the frame and hopper, a rotor on the upper end of the shaft rotatably mounted in the hopper for forcing the contents of the hopper through the opening on to the partition, and a rotor secured to the lower end of the shaft in close proximity to the partition, and means extending in the frame for operating said shaft.

3. A seed separator comprising a frame, a hopper supported by the frame, the base of the hopper provided with an opening, a foraminous partition secured in the frame and located below the hopper, a shaft rotatably mounted in the base of the hopper, a casing positioned concentrically about the shaft and depending from the base of the hopper, a rotor at the upper end of the shaft and located in the hopper, a second rotor secured to the lower end of the shaft and in close proximity to the partition and means extending through the frame engaging the last named rotor for rotating the shaft and rotors in the hopper and frame as and for the purpose specified.

In testimony whereof I affix my signature in presence of two witnesses.

JOHN H. LAW.

Witnesses:
  Jos. S. Calhoun,
  O. W. Haney.

Copies of this patent may be obtained for five cents each, by addressing the "Commissioner of Patents, Washington, D. C."